US012589998B2

(12) United States Patent
Xiong et al.

(10) Patent No.: US 12,589,998 B2
(45) Date of Patent: Mar. 31, 2026

(54) METHOD FOR PREPARING TRISILYLAMINE (TSA) AT ULTRA-LOW TEMPERATURE

(71) Applicant: ZHEJIANG BRITECH CO., LTD., Quzhou (CN)

(72) Inventors: Wenhui Xiong, Quzhou (CN); Qinqi Xu, Quzhou (CN); Gang Chen, Quzhou (CN); Jun Li, Quzhou (CN); Guangdi Zhang, Quzhou (CN); Huilong He, Quzhou (CN); Xiaodong Zhang, Quzhou (CN); Ping Li, Quzhou (CN)

(73) Assignee: ZHEJIANG BRITECH CO., LTD., Quzhou (CN)

( * ) Notice: Subject to any disclaimer, the term of this patent is extended or adjusted under 35 U.S.C. 154(b) by 69 days.

(21) Appl. No.: 18/017,643

(22) PCT Filed: May 27, 2022

(86) PCT No.: PCT/CN2022/095428
§ 371 (c)(1),
(2) Date: Jan. 23, 2023

(87) PCT Pub. No.: WO2023/065669
PCT Pub. Date: Apr. 27, 2023

(65) Prior Publication Data

US 2024/0246817 A1 Jul. 25, 2024

(30) Foreign Application Priority Data

Oct. 18, 2021 (CN) .......................... 202111211358.5

(51) Int. Cl.
*C01B 21/087* (2006.01)

(52) U.S. Cl.
CPC .................................. *C01B 21/087* (2013.01)

(58) Field of Classification Search
None
See application file for complete search history.

(56) References Cited

U.S. PATENT DOCUMENTS

2013/0089487 A1* 4/2013 Ritter, III .............. C01B 21/087
423/324
2014/0161705 A1* 6/2014 Hoppe ..................... B01J 19/24
422/187

FOREIGN PATENT DOCUMENTS

WO WO-2013119902 A1 * 8/2013 ........... C01B 21/087

* cited by examiner

*Primary Examiner* — Michael Forrest
(74) *Attorney, Agent, or Firm* — MARSHALL, GERSTEIN & BORUN LLP

(57) ABSTRACT

The present disclosure relates to the technical field of preparation of trisilylamine (TSA), in particular to a method for preparing TSA at an ultra-low temperature. The present disclosure provides a method for preparing TSA without a solvent at an ultra-low temperature, where by-products generated by a reaction can be easily removed by filtration with a metal ion-adsorption permeable membrane. The TSA obtained by the reaction has a gas chromatography (GC) purity of 99.5%, a receivable yield of not less than 85% (in terms of ammonia), and a metal ion purity of 6N. In addition, the method has a simple device, a high reaction degree of raw materials, a lower cost, a great market value, and a better industrial production benefit.

7 Claims, 3 Drawing Sheets

METHOD FOR PREPARING TRISILYLAMINE (TSA) AT ULTRA-LOW TEMPERATURE

CROSS REFERENCE TO RELATED APPLICATION

The present application claims the priority to Chinese Patent Application No. CN202111211358.5, titled "METHOD FOR PREPARING TRISILYLAMINE (TSA) AT ULTRA-LOW TEMPERATURE", filed with China National Intellectual Property Administration (CNIPA) on Oct. 18, 2021, which is incorporated herein by reference in its entirety.

TECHNICAL FIELD

The present disclosure relates to the technical field of preparation of trisilylamine (TSA), in particular to a method for preparing TSA at an ultra-low temperature.

BACKGROUND

Trisilylamine (TSA) is a popular precursor in semiconductor processing. The growing market demand urgently seeks an efficient preparation method of the TSA in industry. Currently, the preparation method is classified according to the reaction mode of TSA, including only gas-gas reaction, gas-liquid reaction, or liquid-liquid reaction.

Most of the reactions disclosed in the existing patents are generally single solvent-based or mixed solvent-based systems, and there are also reactions of solvent-free systems, showing an easier reaction and purification process, which are detailed as follows:

Patent CN103619429A disclosed a method for preparing TSA from monochlorosilane (MCS) and ammonia. Directly using the MCS as a solvent, the ammonia is directly introduced into the liquid of MCS at −60° C. to +40° C. After the reaction, the excess MCS needs to be distilled and condensed back to a reactor. The method can be conducted batchwise or continuously and requires a large amount of energy. In practical situations, the solid ammonium chloride generated by the reaction may quickly occupy the entire reactor, resulting in the reaction being difficult to conduct completely or an extremely low yield. Moreover, the full text of the patent does not mention matters related to the yield.

Patent CN104250007A disclosed a method for preparing TSA. Using a reaction product TSA directly as a reaction solvent, a reaction mixture of TSA and MCS is provided to a reactor, followed by adding anhydrous ammonia, where the reaction mixture includes a stoichiometric excess of up to 30 wt %, or a stoichiometric excess of about 3 wt % to 5 wt % of the MCS relative to ammonia; the reaction is conducted at 20° C. to 120° C., and a large amount of the MCS needs to be distilled and condensed back to the reactor after the reaction. The method needs to consume a lot of energy, and MCS, $NH_3$, and TSA have an extremely low flash point, showing a relatively high danger coefficient under their corresponding temperature and pressure during the reaction.

To sum up, a technical problem to be solved by the present disclosure is to provide a method for preparing TSA without a solvent at an ultra-low temperature.

SUMMARY

The present disclosure discloses a method for preparing TSA at an ultra-low temperature, and belongs to the technical field of preparation of TSA. The TSA can be prepared under a low temperature without a solvent.

The present disclosure provides a method for preparing trisilylamine (TSA) at an ultra-low temperature, including the following steps:

introducing monochlorosilane (MCS) gas slowly into an ultra-low temperature reaction vessel equipped with a mechanical stirrer and at a low temperature ranging from −40° C. to −100° C.; adding ammonia in a gaseous bubbling form by mixing and diluting nitrogen and anhydrous ammonia, a liquid dripping form by liquefaction of the anhydrous ammonia, or a solid form in batches by solidification of the anhydrous ammonia; subjecting liquefied MCS and ammonia ($NH_3$) to an ultra-low temperature reaction at a molar ratio of 1:(1.2-1.4), 1:1.5, or 1:1.6, to generate a large amount of a ammonium chloride solid, and removing the solid by filtration; reintroducing an obtained mother liquor into the ultra-low temperature reaction vessel, adding the ammonia, and conducting filtration; repeating the process not less than 3 to 5 times by reintroducing an newly-obtained mother liquor into the ultra-low temperature reaction vessel, adding the ammonia, and conducting filtration; detecting the MCS by on-line gas chromatography (GC), when only a small amount of the MCS is remained, conducting filtration with a metal ion-adsorption permeable membrane, and introducing a resulting filtrate directly into a rectification device to conduct purification; where in the gaseous bubbling form by mixing and diluting nitrogen and anhydrous ammonia, the nitrogen has a volume ratio of 10% to 90%. Further, the ultra-low temperature reaction is conducted at −65° C. to −85° C.

Further, the filtration is conducted with the metal ion-adsorption permeable membrane.

Further, a preparation method of the metal ion-adsorption permeable membrane includes the following steps:

S1: immersing 100 parts to 120 parts by weight of a polysulfone hollow fiber ultrafiltration membrane into 1,000 parts to 2,000 parts by weight of n-hexane, adding 5 parts to 15 parts by weight of 3-(N-allylamino)propyltrimethoxysilane, stirring and heating to 45° C. to 55° C., conducting a reaction for 100 min to 200 min, removing the membrane, washing with water, and drying; and S2: immersing a dried membrane into 1,000 parts to 2,000 parts by weight of tetrahydrofuran, adding 5 parts to 20 parts by weight of 5-bromo-6-mercaptopyridine, adding 3 parts to 7 parts by weight of a photoinitiator 907, and stirring and heating to 45° C. to 60° C., conducting a reaction for 100 min to 200 min; removing the membrane, drying, and conducting curing and cross-linking at 10 cm to 40 cm away from an ultraviolet (UV) lamp in a UV curing box for 10 min to 30 min, to obtain the metal ion-adsorption permeable membrane.

Further, the UV lamp has a power of 500 W to 1,000 W.

Further, the UV lamp has a UV wavelength of 220 nm to 400 nm.

Further, the purification specifically includes: adding 300 parts to 500 parts by weight of the filtrate, and introducing a fore-cut fraction into a fore-cut fraction collection tank under specified temperature and pressure; collecting a TSA product into a finished product tank, conducting rectification at an atmospheric pressure, and terminating the rectification after retaining a liquid level of 4% to 7%.

Further, the specified temperature and pressure are 60° C. to 70° C. and 2 kPa to 5 kPa, respectively.

In the present disclosure, the ultra-low temperature reaction has a reaction mechanism as follows:

$$3H_3SiCl + 4NH_3 \xrightarrow[30\text{ to }180\text{ min}]{-85°\text{ C. to }-65°\text{ C.}} N(SiH_3)_3 + 3NH_4Cl\downarrow$$

Under the low temperature, it is conducive to a forward progress of the reaction; it is beneficial to the stability of raw materials and products, and a decomposition rate is greatly reduced; it is beneficial for generated by-products to be precipitated with smaller particles, and a small amount of liquid remaining on the solid after filtration can be directly ignored.

Technical Innovation Points:

(1) The reaction is an ultra-low temperature reaction without solvent at −40° C. to −100° C.

(2) In the reaction vessel, ingredients of a mixed material to be stirred include MCS and TSA at a ratio of 100%: 0% to 0%: 100%, that is, a mixture of the TSA and the MCS can be directly used as a reaction solvent.

(3) The amine source is added in batches in a gaseous bubbling form by mixing and diluting nitrogen (10% to 90% by volume) and anhydrous ammonia, a liquid dripping form by liquefaction of the anhydrous ammonia, or a solid form in batches by solidification of the anhydrous ammonia. Therefore, three reaction modes can be formed, including: a g-l (gas-liquid) reaction, a 1-1 (liquid-liquid) reaction, and a s-l (solid-liquid) reaction.

(4) The liquid directly output after the reaction is mainly a relatively-stable TSA product, such that a danger coefficient of the whole reaction can be minimized.

(5) The raw material MCS used in the reaction only needs a slight excess, which can maximize the utilization of raw materials in one reaction cycle.

(6) In addition, in the metal ion-adsorption permeable membrane, a polysulfone hollow fiber ultrafiltration membrane is reacted with 3-(N-allylamino)propyltrimethoxysilane to introduce double bonds, and then subjected to mercapto-ene click chemistry with 5-bromo-6-mercaptopyridine. As a result, a surface of the permeable membrane can form complexes with trace metal elements to trap metal ions, thereby reducing a content of the metal ions, so as to facilitate the generation of electronic-grade TSA.

Technical Effects:

(1) By-products generated in the reaction can be easily removed by filtration, and the entire batch of reactions requires a certain number of filtration cycles. The TSA finally obtained in the reaction has a GC purity of 99.5% and a metal ion purity of 6N.

(2) The method has a simple and convenient device, a high degree of raw material reaction, and a lower cost than other patents. Accordingly, the method has a great market value and a better industrialized production benefit.

DETAILED DESCRIPTION OF THE EMBODIMENTS

Figure 1:
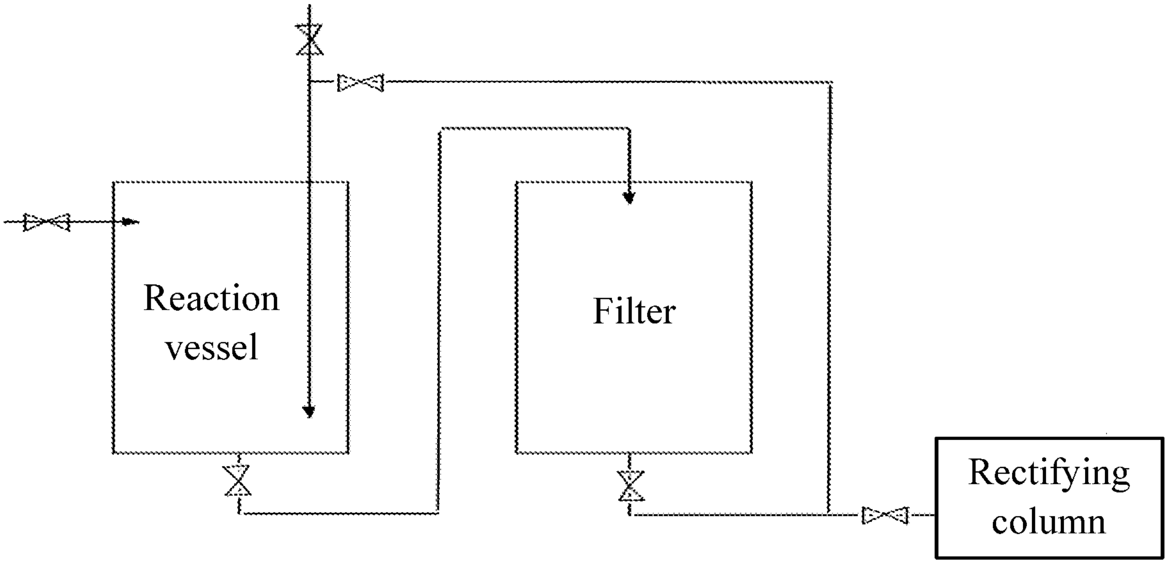
FIG. 1 shows a schematic diagram of a device: parts shown in the diagram all need to be insulated and can be maintained in an ultra-low temperature state.
Figure 2:
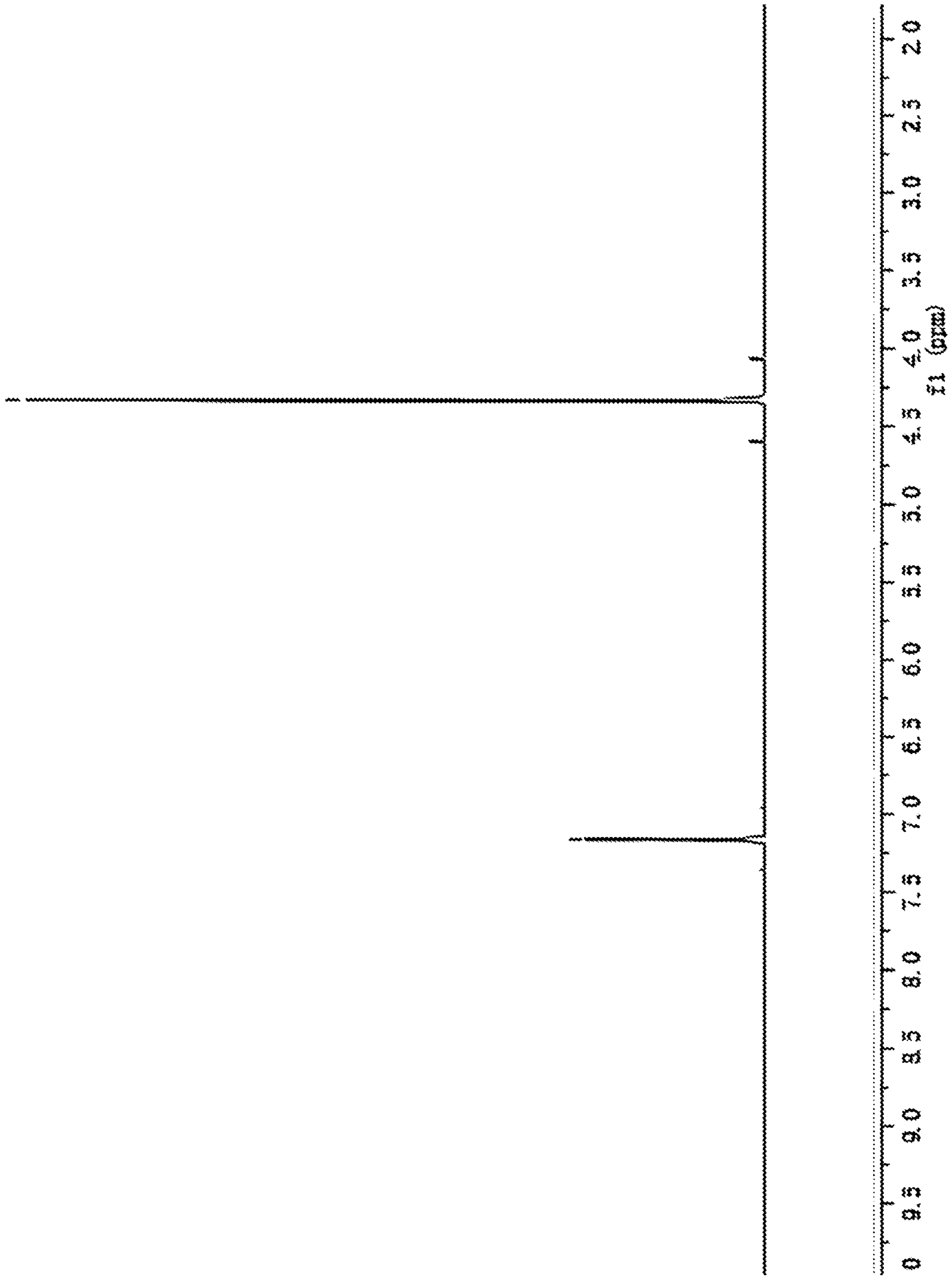
FIG. 2 shows a nuclear magnetic resonance (NMR) spectrum.
Figure 3:
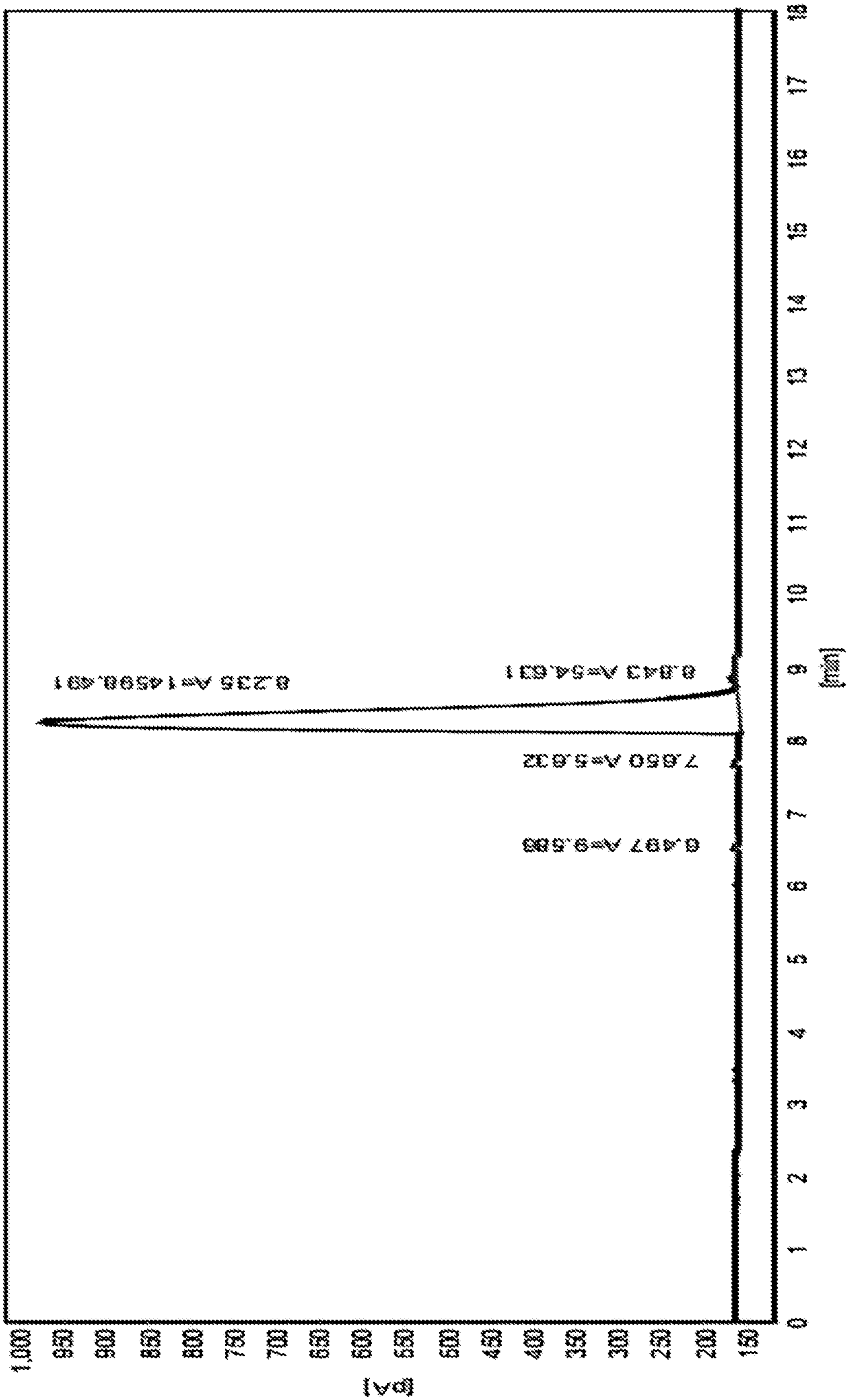
FIG. 3 shows a gas chromatography (GC) map.

Detection Method:

The product purity is characterized by domestic GC; the product purity verification and impurity analysis are conducted by hydrogen nuclear magnetic resonance (HNMR) spectroscopy; the content of metal ions in the product is detected by inductively-coupled plasma mass spectrometry (ICP-MS). The test results are shown in Table 1.

The present disclosure is further described below through specific examples.

Example 1

MCS gas was introduced slowly into an ultra-low temperature reaction vessel equipped with a mechanical stirrer; liquefied ammonia was added dropwise; liquefied MCS and $NH_3$ were subjected to an ultra-low temperature reaction at a molar ratio of close to 1:1.2, to generate a large amount of a ammonium chloride solid, and the solid was removed by filtration; an obtained mother liquor was reintroduced into the ultra-low temperature reaction vessel, the ammonia was added, and filtration was conducted; the process was repeated 5 times by reintroducing an newly-obtained mother liquor into the ultra-low temperature reaction vessel, adding the ammonia, and conducting filtration; the MCS was detected by on-line GC, when only a small amount of the MCS was remained, filtration was conducted with a metal ion-adsorption permeable membrane, and a resulting filtrate was introduced directly into a rectification device to conduct purification; where the ultra-low temperature reaction was conducted at −65° C.;

the amine source was added in a gaseous bubbling form by mixing and diluting nitrogen (10% by volume) and anhydrous ammonia; and the filtration was conducted with a metal ion-adsorption permeable membrane.

A preparation method of the metal ion-adsorption permeable membrane included the following steps:

S1: 100 g of a polysulfone hollow fiber ultrafiltration membrane was immersed into 1,000 g of n-hexane, 5 g of 3-(N-allylamino)propyltrimethoxysilane was added, stirred and heated to 45° C., and a reaction was conducted for 100 min, the membrane was removed, washed with water, and dried; and S2: a dried membrane was immersed into 1,000 g of tetrahydrofuran, 5 g of 5-bromo-6-mercaptopyridine was added, 3 g of a photoinitiator 907 was added, stirred and heated to 45° C., and a reaction was conducted for 100 min; the membrane was removed, dried, and curing and cross-linking were conducted at 10 cm away from a UV lamp in a UV curing box for 10 min, to obtain the metal ion-adsorption permeable membrane; where the UV lamp had a power of 500 W; and the UV lamp had a UV wavelength of 320 nm.

The rectification (purification) specifically included: 300 g of a crude product (filtrate) was added, and a fore-cut fraction was introduced into a fore-cut fraction collection tank under specified temperature and pressure; a TSA product was collected into a finished product tank, rectification was conducted at an atmospheric pressure, and the rectification was terminated after retaining a liquid level of about 4%; where the specified temperature was 60° C.; and the specified pressure was 2 kPa.

The TSA finally obtained in the reaction had a GC purity of 99.1% and a metal ion purity of 6N.

Example 2

MCS gas was introduced slowly into an ultra-low temperature reaction vessel equipped with a mechanical stirrer; liquefied ammonia was added dropwise; liquefied MCS and $NH_3$ were subjected to an ultra-low temperature reaction at a molar ratio of close to 1:1.3, to generate a large amount of a ammonium chloride solid, and the solid was removed by filtration; an obtained mother liquor was reintroduced into the ultra-low temperature reaction vessel, the ammonia was added, and filtration was conducted; the process was repeated 5 times by reintroducing an newly-obtained mother liquor into the ultra-low temperature reaction vessel, adding the ammonia, and conducting filtration; the MCS was detected by on-line GC, when only a small amount of the MCS was remained, filtration was conducted with a metal ion-adsorption permeable membrane, and a resulting filtrate was introduced directly into a rectification device to conduct purification; where the ultra-low temperature reaction was conducted at −65° C.;

the amine source was added in a gaseous bubbling form by mixing and diluting nitrogen (50% by volume) and anhydrous ammonia; and the filtration was conducted with a metal ion-adsorption permeable membrane.

A preparation method of the metal ion-adsorption permeable membrane included the following steps:

S1: 100 g of a polysulfone hollow fiber ultrafiltration membrane was immersed into 1,200 g of n-hexane, 6 g of 3-(N-allylamino)propyltrimethoxysilane was added, stirred and heated to 50° C., and a reaction was conducted for 120 min, the membrane was removed, washed with water, and dried; and S2: a dried membrane was immersed into 1,200 g of tetrahydrofuran, 8 g of 5-bromo-6-mercaptopyridine was added, 5 g of a photoinitiator 907 was added, stirred and heated to 50° C., and a reaction was conducted for 120 min; the membrane was removed, dried, and curing and cross-linking were conducted at 20 cm away from a UV lamp in a UV curing box for 20 min, to obtain the metal ion-adsorption permeable membrane; where the UV lamp had a power of 800 W; and the UV lamp had a UV wavelength of 220 nm.

The rectification (purification) specifically included: 400 g of a crude product (filtrate) was added, and a fore-cut fraction was introduced into a fore-cut fraction collection tank under specified temperature and pressure; a TSA product was collected into a finished product tank, rectification was conducted at an atmospheric pressure, and the rectification was terminated after retaining a liquid level of about 5%; where the specified temperature was 65° C.; and the specified pressure was 3 kPa.

The TSA finally obtained in the reaction had a GC purity of 99.4% and a metal ion purity of 6N.

Example 3

MCS gas was introduced slowly into an ultra-low temperature reaction vessel equipped with a mechanical stirrer; liquefied ammonia was added dropwise; liquefied MCS and $NH_3$ were subjected to an ultra-low temperature reaction at a molar ratio of close to 1:1.4, to generate a large amount of a ammonium chloride solid, and the solid was removed by filtration; an obtained mother liquor was reintroduced into the ultra-low temperature reaction vessel, the ammonia was added, and filtration was conducted; the process was repeated 5 times by reintroducing an newly-obtained mother liquor into the ultra-low temperature reaction vessel, adding the ammonia, and conducting filtration; the MCS was detected by on-line GC, when only a small amount of the MCS was remained, filtration was conducted with a metal ion-adsorption permeable membrane, and a resulting filtrate was introduced directly into a rectification device to conduct purification; where the ultra-low temperature reaction was conducted at −75° C.;

the amine source was added in a gaseous bubbling form by mixing and diluting nitrogen (90% by volume) and anhydrous ammonia; and the filtration was conducted with a metal ion-adsorption permeable membrane.

A preparation method of the metal ion-adsorption permeable membrane included the following steps:

S1: 100 g of a polysulfone hollow fiber ultrafiltration membrane was immersed into 1,500 g of n-hexane, 8 g of 3-(N-allylamino)propyltrimethoxysilane was added, stirred and heated to 55° C., and a reaction was conducted for 150 min, the membrane was removed, washed with water, and dried; and S2: a dried membrane was immersed into 1,500 g of tetrahydrofuran, 12 g of 5-bromo-6-mercaptopyridine was added, 7 g of a photoinitiator 907 was added, stirred and heated to 60° C., and a reaction was conducted for 150 min; the membrane was removed, dried, and curing and cross-linking were conducted at 30 cm away from a UV lamp in a UV curing box for 25 min, to obtain the metal ion-adsorption permeable membrane; where the UV lamp had a power of 1,000 W; and the UV lamp had a UV wavelength of 220 nm.

The rectification (purification) specifically included: 500 g of a crude product (filtrate) was added, and a fore-cut fraction was introduced into a fore-cut fraction collection tank under specified temperature and pressure; a TSA product was collected into a finished product tank, rectification was conducted at an atmospheric pressure, and the rectification was terminated after retaining a liquid level of about 7%; where the specified temperature was 70° C.; and the specified pressure was 5 kPa.

The TSA finally obtained in the reaction had a GC purity of 99.5% and a metal ion purity of 6N.

Example 4

MCS gas was introduced slowly into an ultra-low temperature reaction vessel equipped with a mechanical stirrer; liquefied ammonia was added dropwise; liquefied MCS and $NH_3$ were subjected to an ultra-low temperature reaction at a molar ratio of close to 1:1.5, to generate a large amount of a ammonium chloride solid, and the solid was removed by filtration; an obtained mother liquor was reintroduced into the ultra-low temperature reaction vessel, the ammonia was added, and filtration was conducted; the process was repeated 5 times by reintroducing an newly-obtained mother liquor into the ultra-low temperature reaction vessel, adding the ammonia, and conducting filtration; the MCS was detected by on-line GC, when only a small amount of the MCS was remained, filtration was conducted with a metal ion-adsorption permeable membrane, and a resulting filtrate was introduced directly into a rectification device to conduct purification; where the ultra-low temperature reaction was conducted at −75° C.;

the amine source was added in a liquid dripping form by liquefaction of the anhydrous ammonia; and the filtration was conducted with a metal ion-adsorption permeable membrane.

A preparation method of the metal ion-adsorption permeable membrane included the following steps:

S1: 120 g of a polysulfone hollow fiber ultrafiltration membrane was immersed into 1,600 g of n-hexane, 12 g of 3-(N-allylamino)propyltrimethoxysilane was added, stirred and heated to 50° C., and a reaction was conducted for 180 min, the membrane was removed, washed with water, and dried; and S2: a dried membrane was immersed into 1,600 g of tetrahydrofuran, 15 g of 5-bromo-6-mercaptopyridine was added, 6 g of a photoinitiator 907 was added, stirred and heated to 60° C., and a reaction was conducted for 180 min; the membrane was removed, dried, and curing and cross-linking were conducted at 10 cm away from a UV lamp in a UV curing box for 10 min, to obtain the metal ion-adsorption permeable membrane; where the UV lamp had a power of 500 W; and the UV lamp had a UV wavelength of 320 nm.

The rectification (purification) specifically included: 300 g of a crude product (filtrate) was added, and a fore-cut fraction was introduced into a fore-cut fraction collection tank under specified temperature and pressure; a TSA product was collected into a finished product tank, rectification was conducted at an atmospheric pressure, and the rectification was terminated after retaining a liquid level of about 4%; where the specified temperature was 60° C.; and the specified pressure was 4 kPa.

The TSA finally obtained in the reaction had a GC purity of 99.2% and a metal ion purity of 6N.

Example 5

MCS gas was introduced slowly into an ultra-low temperature reaction vessel equipped with a mechanical stirrer; liquefied ammonia was added dropwise; liquefied MCS and $NH_3$ were subjected to an ultra-low temperature reaction at a molar ratio of close to 1:1.6, to generate a large amount of a ammonium chloride solid, and the solid was removed by filtration; an obtained mother liquor was reintroduced into the ultra-low temperature reaction vessel, the ammonia was added, and filtration was conducted; the process was repeated 5 times by reintroducing an newly-obtained mother liquor into the ultra-low temperature reaction vessel, adding the ammonia, and conducting filtration; the MCS was detected by on-line GC, when only a small amount of the MCS was remained, filtration was conducted with a metal ion-adsorption permeable membrane, and a resulting filtrate was introduced directly into a rectification device to conduct purification; where the ultra-low temperature reaction was conducted at −85° C.;

the amine source was added in a solid form in batches by solidification of the anhydrous ammonia; and the filtration was conducted with a metal ion-adsorption permeable membrane.

A preparation method of the metal ion-adsorption permeable membrane included the following steps:

S1: 120 g of a polysulfone hollow fiber ultrafiltration membrane was immersed into 1,800 g of n-hexane, 12 g of 3-(N-allylamino)propyltrimethoxysilane was added, stirred and heated to 55° C., and a reaction was conducted for 200 min, the membrane was removed, washed with water, and dried; and S2: a dried membrane was immersed into 1,800 g of tetrahydrofuran, 20 g of 5-bromo-6-mercaptopyridine was added, 7 g of a photoinitiator 907 was added, stirred and heated to 60° C., and a reaction was conducted for 200 min; the membrane was removed, dried, and curing and cross-linking were conducted at 20 cm away from a UV lamp in a UV curing box for 20 min, to obtain the metal ion-adsorption permeable membrane; where the UV lamp had a power of 1,000 W; and the UV lamp had a UV wavelength of 400 nm.

The rectification (purification) specifically included: 500 g of a crude product (filtrate) was added, and a fore-cut fraction was introduced into a fore-cut fraction collection tank under specified temperature and pressure; a TSA product was collected into a finished product tank, rectification was conducted at an atmospheric pressure, and the rectification was terminated after retaining a liquid level of about 7%; where the specified temperature was 70° C.; and the specified pressure was 5 kPa.

The TSA finally obtained in the reaction had a GC purity of 99.4% and a metal ion purity of 6N.

Comparative Example 1

In this comparative example, the reaction conditions were exactly the same as those in Example 1, but membrane filtration was not conducted.

The TSA finally obtained in the reaction had a GC purity of 99.1% and a metal ion purity of 3N.

Comparative Example 2

In this comparative example, the reaction conditions were exactly the same as those in Example 1, but the filtration was conducted with a polysulfone hollow fiber ultrafiltration membrane.

The TSA finally obtained in the reaction had a GC purity of 99.1% and a metal ion purity of 4N.

Table 1 Data of TSA obtained by reactions of Examples 1 to 5 and Comparative Examples 1 to 2

| | Example 1 | Example 2 | Example 3 | Example 4 | Example 5 | Comparative Example 1 | Comparative Example 2 |
|---|---|---|---|---|---|---|---|
| GC purity | 99.1% | 99.4% | 99.5% | 99.2% | 99.4% | 99.1% | 99.1% |
| Metal ion purity | 6N | 6N | 6N | 6N | 6N | 3N | 4N |

The above description of examples is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various amendments to these embodiments are apparent to those of professional skill in the art, and the general principles defined herein may be implemented in other embodiments without departing from the spirit or scope of the present disclosure. Thus, the present disclosure is not limited to the examples shown herein but falls within the widest scope consistent with the principles and novel features disclosed herein.

What is claimed:

1. A method for preparing trisilylamine (TSA) at an ultra-low temperature, comprising the following steps:

introducing monochlorosilane (MCS) gas into an ultra-low temperature reaction vessel equipped with a mechanical stirrer and at a low temperature ranging from 100° C. to −40° C.; adding ammonia in a gaseous bubbling form by mixing and diluting nitrogen and anhydrous ammonia, a liquid dripping form by liquefaction of the anhydrous ammonia, or a solid form in batches by solidification of the anhydrous ammonia; subjecting liquefied MCS and ammonia ($NH_3$) to an ultra-low temperature reaction at a molar ratio of 1:(1.2-1.4), 1:1.5, or 1:1.6, to generate an ammonium chloride solid, and removing the solid by filtration; reintroducing an obtained mother liquor into the ultra-low temperature reaction vessel, adding the ammonia, and conducting filtration; repeating the process not less than 3 times and up to 5 times by reintroducing a newly-obtained mother liquor into the ultra-low temperature reaction vessel, adding the ammonia, and conducting filtration; detecting the MCS by on-line gas chromatography (GC), when only a small amount of the MCS remains, conducting filtration with a metal ion-adsorption permeable membrane, and introducing a resulting filtrate directly into a rectification device to conduct purification; wherein the ammonia in the gaseous bubbling form by mixing and diluting nitrogen and anhydrous ammonia, the nitrogen has a volume ratio of 10% to 90%.

2. The method according to claim 1, wherein the ultra-low temperature reaction is conducted at −85° C. to −65° C.

3. The method according to claim 1, wherein a preparation method of the metal ion-adsorption permeable membrane comprises the following steps:

S1: immersing 100 parts to 120 parts by weight of a polysulfone hollow fiber ultrafiltration membrane into 1,000 parts to 2,000 parts by weight of n-hexane, adding 5 parts to 15 parts by weight of 3-(N-allylamino) propyltrimethoxysilane, stirring and heating to 45° C. to 55° C., conducting a reaction for 100 min to 200 min, removing the membrane, washing with water, and drying; and S2: immersing the dried membrane into 1,000 parts to 2,000 parts by weight of tetrahydrofuran, adding 5 parts to 20 parts by weight of 5-bromo-6-mercaptopyridine, adding 3 parts to 7 parts by weight of a photoinitiator 907, stirring and heating to 45° C. to 60° C., and conducting a reaction for 100 min to 200 min; removing the membrane, drying, and conducting curing and cross-linking at 10 cm to 40 cm away from an ultraviolet (UV) lamp in a UV curing box for 10 min to 30 min, to obtain the metal ion-adsorption permeable membrane.

4. The method according to claim 3, wherein the UV lamp has a power of 500 W to 1,000 W.

5. The method according to claim 3, wherein the UV lamp has a UV wavelength of 220 nm to 400 nm.

6. The method according to claim 1, wherein the purification specifically comprises: adding 300 parts to 500 parts by weight of the filtrate, and introducing a fore-cut fraction into a fore-cut fraction collection tank under a specified temperature and pressure; collecting a TSA product into a finished product tank, conducting rectification at an atmospheric pressure, and terminating the rectification after retaining a liquid level of 4% to 7%.

7. The method according to claim 6, wherein the specified temperature and pressure are 60° C. to 70° C. and 2 kPa to 5 kPa, respectively.

* * * * *